July 29, 1952 W. C. WATTS 2,604,724

COMBINED HOLDER FOR A PAD AND A PENCIL

Filed Nov. 13, 1948

INVENTOR.
WILLIAM C. WATTS
BY C. G. Stratton
ATTORNEY

Patented July 29, 1952

2,604,724

UNITED STATES PATENT OFFICE 2,604,724

COMBINED HOLDER FOR A PAD AND A PENCIL

William C. Watts, Los Angeles, Calif., assignor of one-third to Catherine Lockett, Los Angeles, Calif.

Application November 13, 1948, Serial No. 59,933

3 Claims. (Cl. 45—.5)

This invention relates to a combined holder for a pad and a pencil and deals more particularly with a holder especially adapted to be mounted on the base of a "French" type telephone.

The primary object of the present invention is to provide a pad and pencil holder that affords such convenience to the user that, at all times, there is paper and pencil within "finger tip" reach for recording appointments and noting addresses, instructions, etc., and thereby expediting telephone conversations and obviating delay that may be caused by lack of handy writing material.

Another object of the invention is to provide a holder of the nature indicated that is of the slip-on type, not requiring tools of any sort for mounting or dismounting the same, and yet being so formed that it retains its operative position on the telephone under all conditions of normal use.

Another object of the invention is to provide a holder that is designed to be mounted at the rear of a telephone to obviate interference with the use of the instrument and yet being handy to the user.

A further object of the invention is to provide a holder that frictionally mounts on a telephone base and yet will not mar the finish of said base.

The invention also has for its objects to provide such means that are positive in operations, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figures 1, 2:
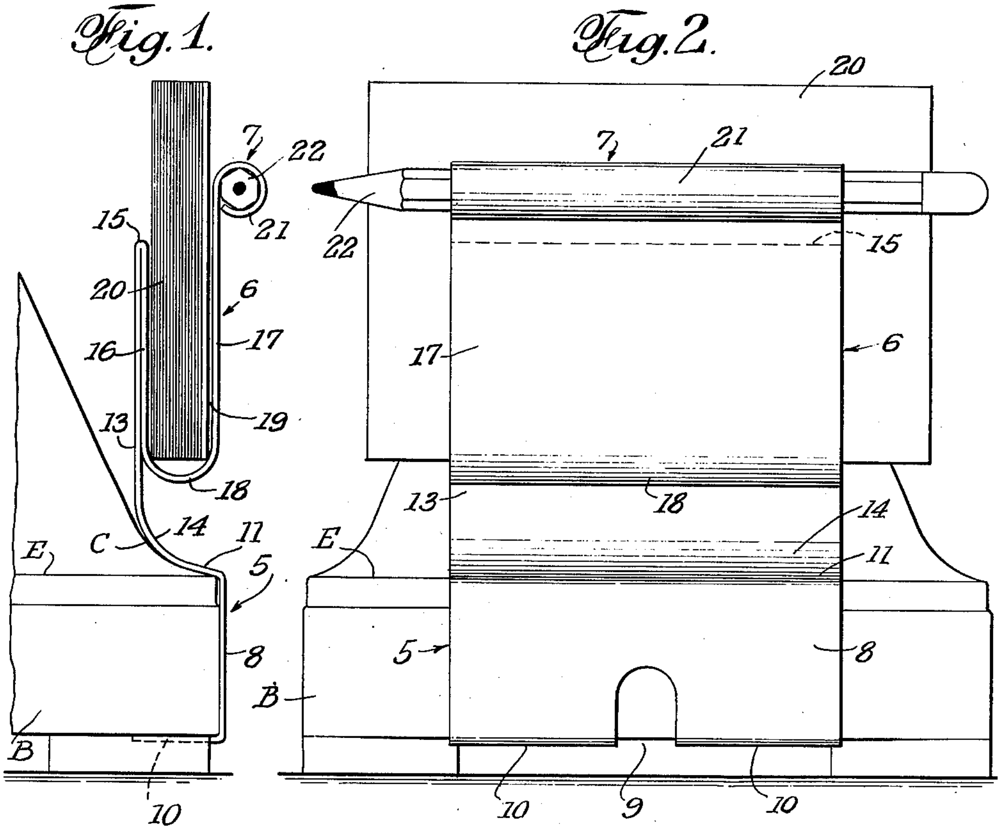
Fig. 1 is a side elevational view of a combined holder for a pad and pencil according to this invention and shown applied to the rear of the base of a "French" type telephone.
Fig. 2 is a rear elevational view thereof.

The present holder is advantageously made of sheet metal and is preferably integrally formed of a single sheet thereof. However, sheet or moulded plastic, or even hard rubber, are other materials from which the device may be made.

The holder that is illustrated in the drawing comprises, generally, an integral sheet formed to have a telephone base-engaging portion 5, a memorandum pad-holding portion 6, and a pencil-holding portion 7.

Figure 3:
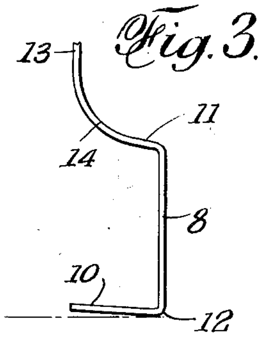
Fig. 3 is a side view of the lower portion of the holder when not in use.

The portion 5 comprises a generally vertical part 8 of a height that is substantially that of the base B of the telephone, an inwardly bent lower part that is preferably bifurcated as at 9 to comprise resilient fingers 10 between which the telephone cord may pass, and an inwardly bent upper part 11. The fingers 10 are designed to engage the bottom and part 11 the upper edge E of the telephone base to, thereby, provide a clamp that frictionally and securely mounts the holder on said base. As best seen in Fig. 3, the fingers 10 are initially bent to be at an upward angle of some 5° to the horizontal. Said fingers, having resiliency on the bend 12, will yield or flex on said bend to firmly draw the part 11 down onto edge E and, thereby, effect desired firm clamping of the holder on base B.

The pad-holding portion 6 is integrally connected to part 11 by a part 13 that is first inwardly curved at 14 to generally follow the curvature C that is formed in the telephone instrument above base B. Said part 13 then extends generally upwardly and terminates at a fold 15 that defines the upper edge of pad-holder 6. The latter comprises spaced wall parts 16 and 17 that are connected by the bottom 18, the part 16 preferably being generally coextensive with part 13 and in contiguity therewith. Thus, the portion 6 is formed to define a trough-like pocket 19 for receiving a pad 20, the same being supported by bottom 18. It will be noted that parts 13, 16 and 17 are generally parallel or nearly so, the upper end of part 17 extending somewhat above fold 15 to bring the pencil-holder 7 to an elevation whereby it is more easily visible to the user.

The pencil-holder 7 comprises a rolled portion 21 that is rearwardly directed not to interfere with pocket 19, and the same is formed to have an internal diameter to lightly frictionally grip a pencil 22 introduced from either end of the pocket formed by rolled portion 21.

In width, the combined holder is made somewhat greater than the distance between the back supporting pads of the telephone instrument so that said holder will wedge between the pads and thereby retain a central position. Thus, non-shiftably held, the holder has no tendency to mar the instrument.

From the above-described structure, it will be seen that the present device resides, in its entirety, at the rear of the telephone and that both the pad and pencil are ready at hand when need therefor arises. It will also be seen that the holder so nicely blends into the telephone instrument that it appears to comprise an integral part of the latter, particularly when said holder is japanned or enamelled in the same color as the instrument.

While the invention that has been illustrated and described is now regarded as the preferred embodiment, the construction is, of course, subject to modifications without departing from the spirit and scope of the invention. It is therefore not desired to restrict the invention to the particular form of construction illustrated and described, but to cover all modifications that may fall within the scope of the appended claims.

Having thus described the invention, what is claimed and desired to be secured by Letters Patent is:

1. A one-piece combined pad and pencil holder for connection to the base of a telephone comprising a mounting portion including a vertical part and inwardly extending upper and lower parts for engaging the upper and lower surfaces of said base, respectively, and a pad holding portion integral with said mounting portion and comprising a vertical wall substantially in the plane of said vertical part, and a second wall parallel with said first mentioned wall and located inwardly thereof, said walls being of equal width and integral with said upper inwardly extending part, one of said walls forming a cylindrical pencil holder.

2. In a holder of the character described for connection to the base of a telephone, a body of resilient sheet material having a vertical base portion, inwardly bent upper and lower base portions for engaging upper and lower surfaces of said base, respectively, said body being bent upwardly from said upper base portion to form a wall, and said body being bent back upon said wall to form a second wall in juxtaposition with said first wall and then folded to form a third wall spaced from said second wall to comprise a U-shaped pad holding section.

3. In a holder of the character described for connection to the base of a telephone, a body of resilient sheet material having a vertical base portion, inwardly bent upper and lower base portions for engaging upper and lower surfaces of said base, respectively, said body being bent upwardly from said upper base portion to form a wall, said body being bent back upon said wall to form a second wall in juxtaposition with said first wall and then folded to form a third wall spaced from said second wall and substantially in the plane of said vertical base portion to comprise a U-shaped pad holding section, the upper end of said third wall being curled to form a substantially cylindrical pencil holder.

WILLIAM C. WATTS.

REFERENCES CITED

The following references are of record in the file of this patent:

UNITED STATES PATENTS

| Number | Name | Date |
|---|---|---|
| 1,042,589 | Newton | Oct. 29, 1912 |
| 1,541,679 | Beenk | June 9, 1925 |
| 1,667,193 | Coleman | Apr. 24, 1928 |
| 1,908,840 | Greist et al. | May 16, 1933 |
| 1,983,443 | Duceska et al. | Dec. 4, 1934 |
| 2,260,774 | Dorsett | Oct. 28, 1941 |
| 2,509,793 | Yost | May 30, 1950 |